(12) United States Patent
Bacon et al.

(10) Patent No.: US 11,034,277 B2
(45) Date of Patent: *Jun. 15, 2021

(54) BOAT SUPPORT FRAME LOADING AND UNLOADING APPARATUS

(71) Applicant: BALEX MARINE DEVELOPMENT LIMITED, Hong Kong (HK)

(72) Inventors: Lex Noel Bacon, Omokoroa (NZ); Paul Antony Symes, Tauranga (NZ); Jonathan Martin Jones, Tauranga (NZ); Blythe Guy Rees-Jones, Papamoa (NZ); Darren Leybourne, Auckland (NZ); Andrew James Percival, Auckland (NZ); Yuri Nikolaevich Ivanov, Auckland (NZ)

(73) Assignee: BALEX MARINE DEVELOPMENT LIMITED, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 16/459,650

(22) Filed: Jul. 2, 2019

(65) Prior Publication Data

US 2019/0329693 A1    Oct. 31, 2019

Related U.S. Application Data

(63) Continuation of application No. 15/310,834, filed as application No. PCT/NZ2015/050053 on May 13, 2015, now Pat. No. 10,336,234.

(30) Foreign Application Priority Data

May 14, 2014    (NZ) .................................. 624986

(51) Int. Cl.
    B60P 3/10     (2006.01)
    B63C 3/12     (2006.01)

(52) U.S. Cl.
    CPC ........... B60P 3/1066 (2013.01); B60P 3/1075 (2013.01); B63C 3/12 (2013.01)

(58) Field of Classification Search
    None
    See application file for complete search history.

(56) References Cited

U.S. PATENT DOCUMENTS 3,731,826 A    5/1973    Johnson
4,363,590 A    12/1982   Crate
(Continued)

FOREIGN PATENT DOCUMENTS

| JP | S61268591 A | 11/1986 |
| WO | 2004103804 A1 | 12/2004 |
| WO | 2013191570 A1 | 12/2013 |

OTHER PUBLICATIONS

Examination Report issued in EP Application No. 15792054.7 dated Nov. 16, 2018.

(Continued)

*Primary Examiner* — Mark H Hageman
(74) *Attorney, Agent, or Firm* — LeonardPatel PC; Michael Aristo Leonard, II; Sheetal Suresh Patel

(57) ABSTRACT

In one aspect the invention provides a boat support frame loading and unloading apparatus configured to draw a boat on to and off a boat support frame. This boat support frame has a loading end and a terminal end opposite to the loading end. The apparatus provided includes at least one roller assembly mounted to the support frame adjacent to the loading end of the support frame, said at least one roller assembly incorporating at least one roller element. The apparatus also includes at least one drive mechanism configured to rotate one or more roller elements to draw a boat onto and off the support frame through the loading end of the support frame. The roller assembly also includes a hull contact surface formed by a flexible belt which has a (Continued)

circumference greater than the circumference of the said at least one roller element incorporated into the roller assembly.

19 Claims, 14 Drawing Sheets

(56) References Cited

U.S. PATENT DOCUMENTS

| | | |
|---|---|---|
| 4,560,316 A | 12/1985 | Daniels |
| 4,592,694 A | 6/1986 | Johnson |
| 4,717,165 A | 1/1988 | Johnson |
| 5,429,383 A | 7/1995 | Reed |
| 7,469,917 B1 | 12/2008 | Heuiser |
| 2003/0209877 A1 | 11/2003 | Beyer |
| 2005/0002767 A1 | 1/2005 | Oosterhouse |
| 2006/0181056 A1 | 8/2006 | Weekes |
| 2015/0183361 A1 | 7/2015 | Bacon |

OTHER PUBLICATIONS

First Examination Report issued in NZ Application No. 727258 dated Sep. 18, 2018.
Information Disclosure Statement filed Nov. 14, 2016.
International Preliminary Report on Patentability, dated Mar. 11, 2016, PCT/NZ2015/050053.
International Search Report dated Oct. 29, 2015, PCT/NZ2015/050053.
Mark C Hageman, "Non-Final Office Action", dated Sep. 27, 2018, U.S. Appl. No. 15/310,834.
Mark C Hageman, Notice of Allowance, dated Feb. 21, 2019, U.S. Appl. No. 15/310,834.

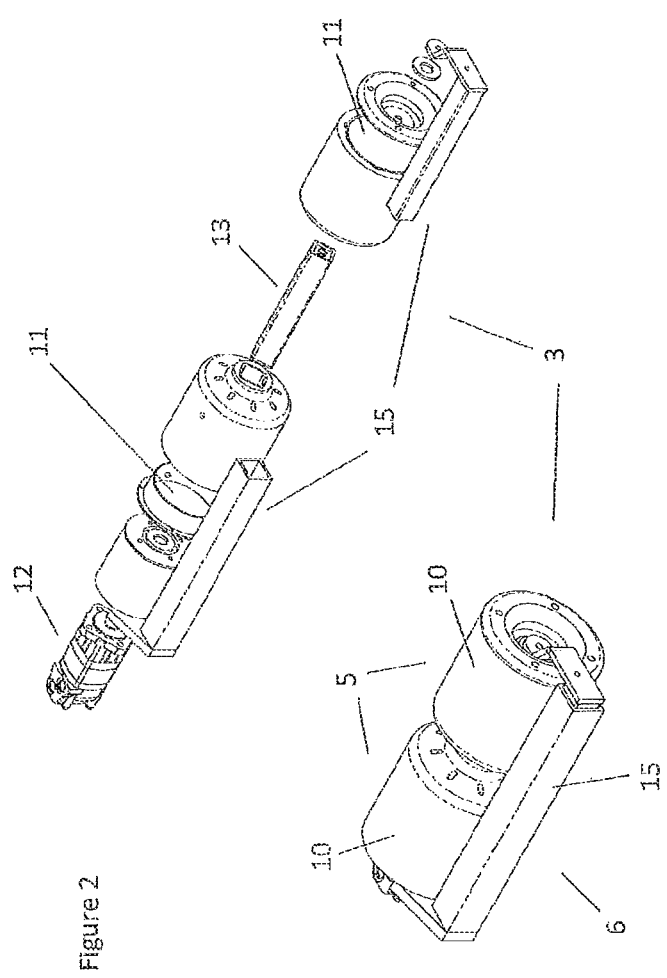

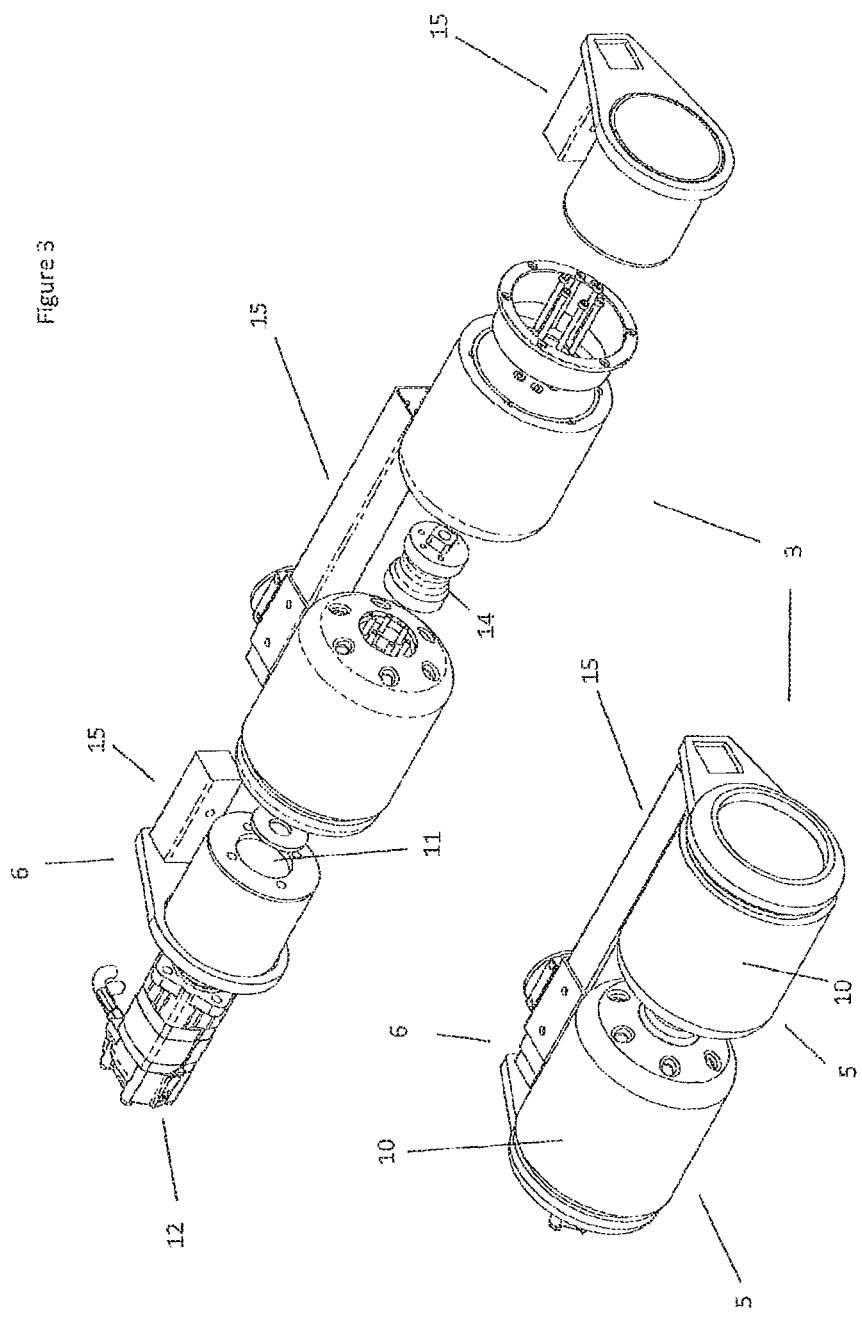

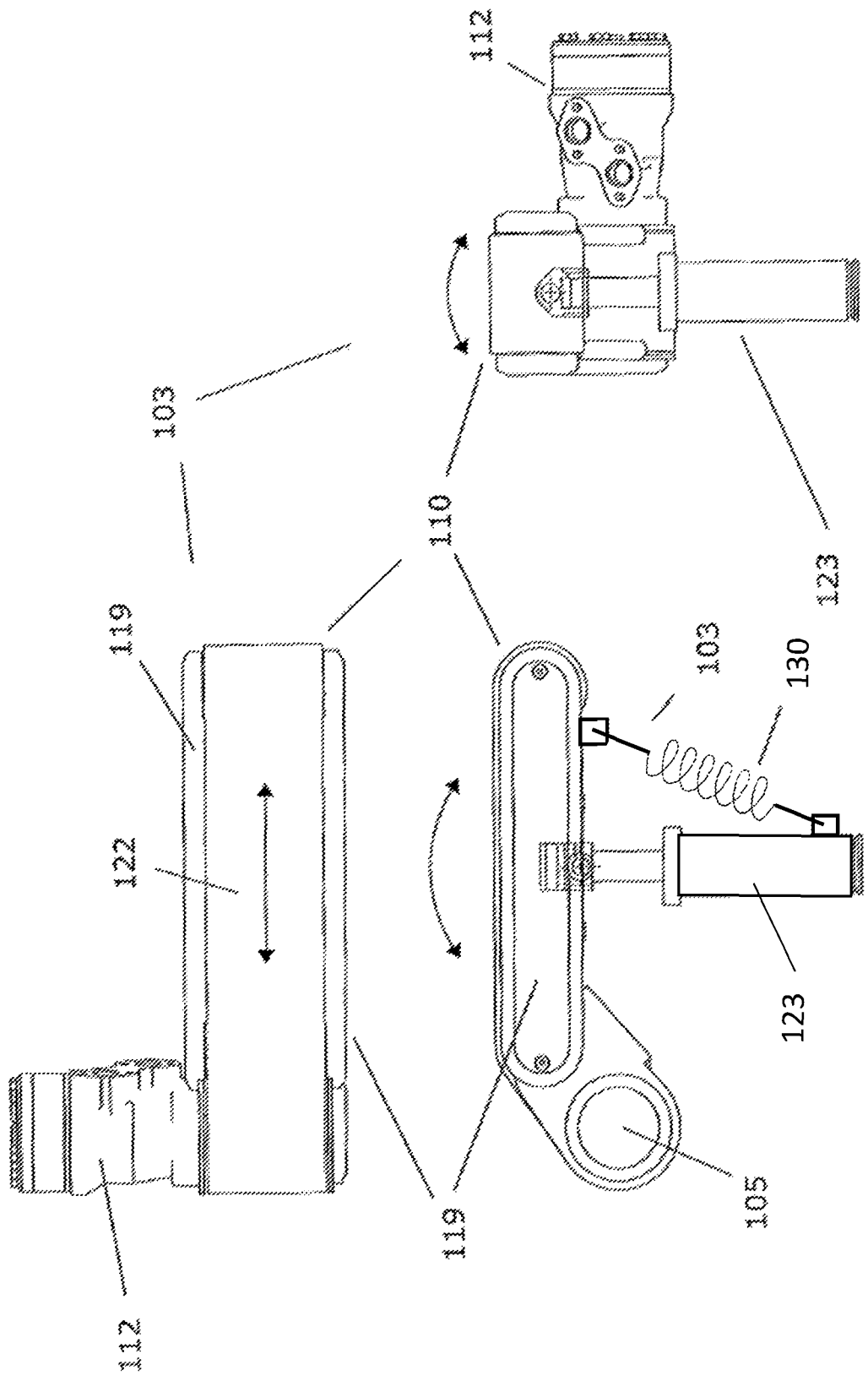

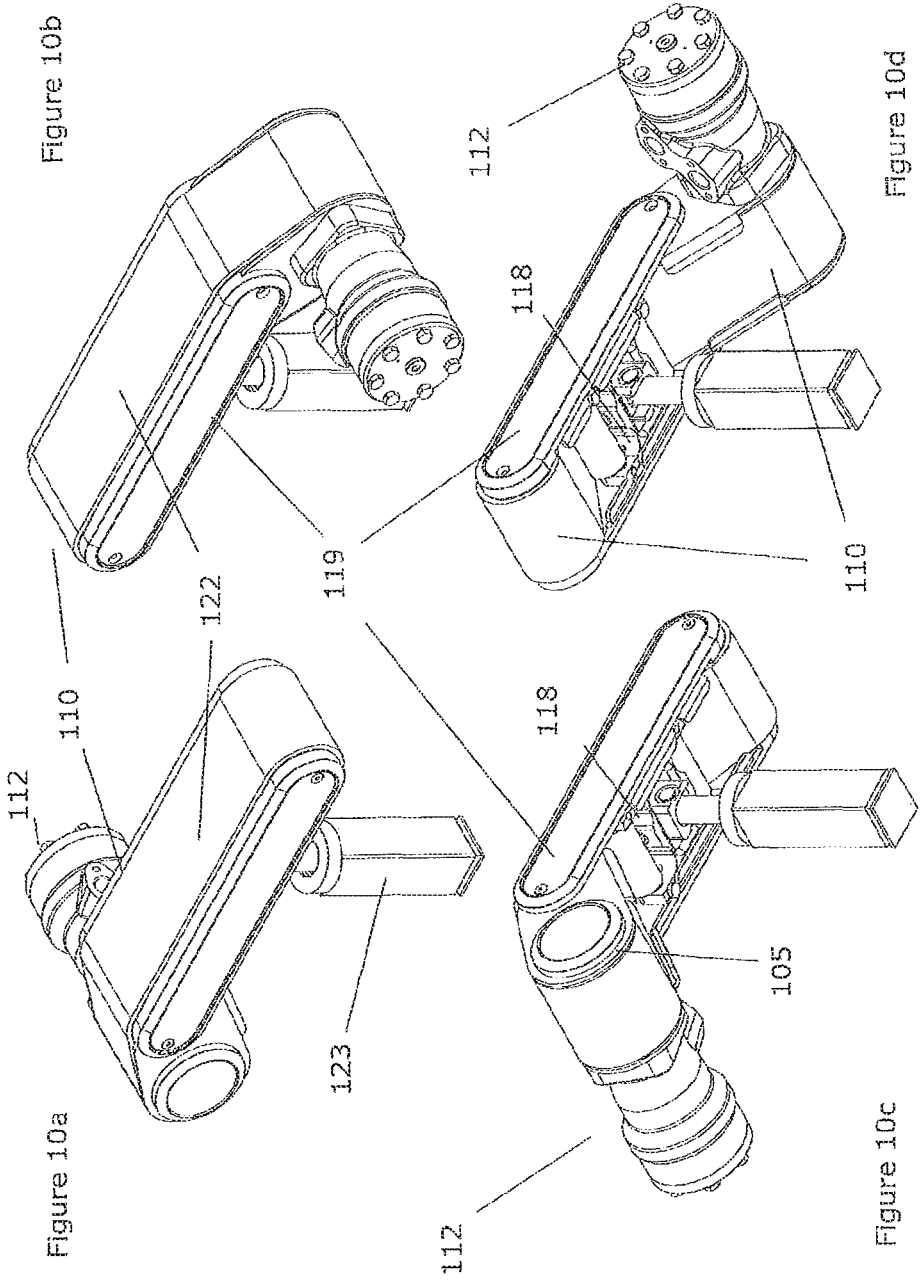

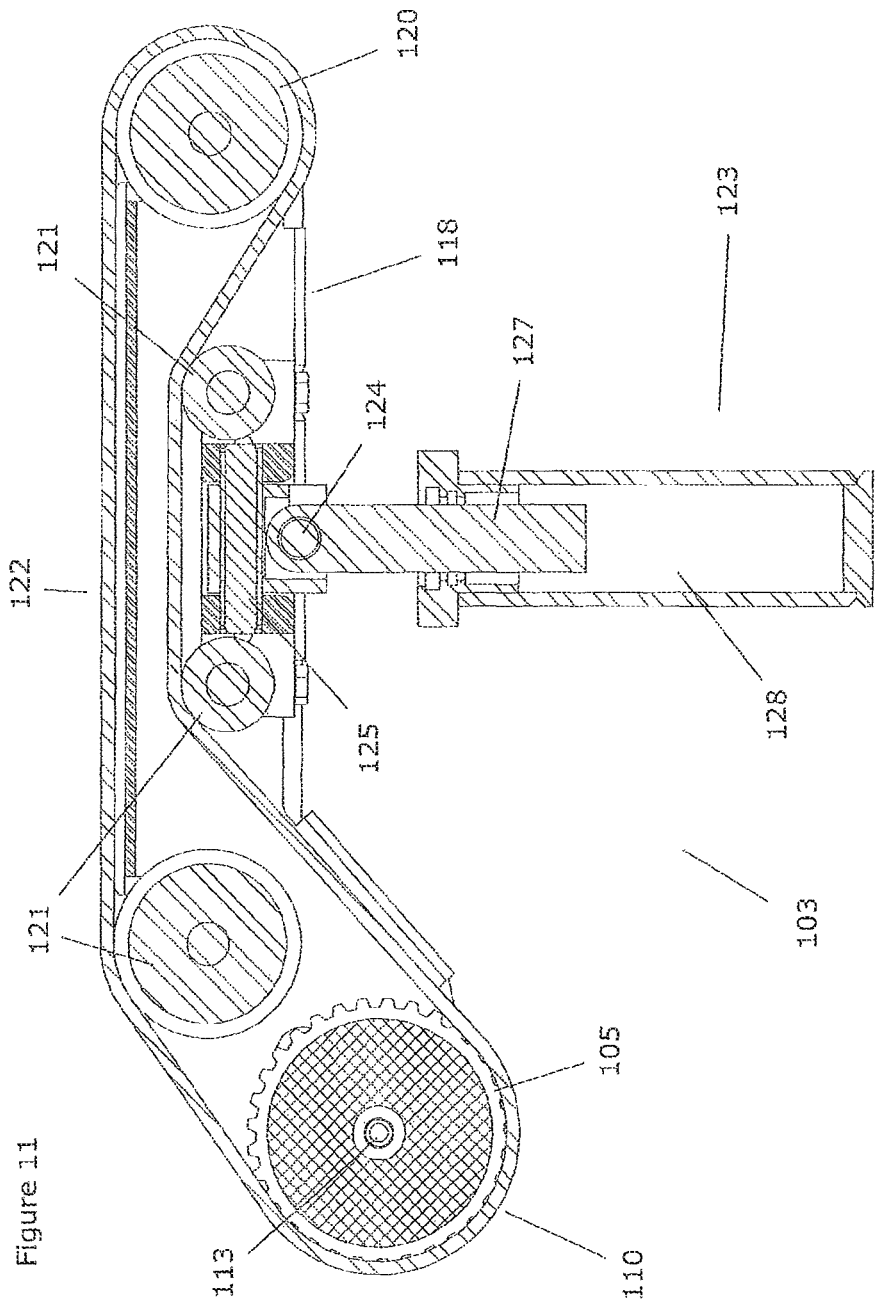

BOAT SUPPORT FRAME LOADING AND UNLOADING APPARATUS

CROSS-REFERENCE TO RELATED APPLICATIONS

This application is a continuation of U.S. Nonprovisional patent application Ser. No. 15/310,834 filed Nov. 14, 2016, issued Jul. 2, 2019, as U.S. Pat. No. 10,336,234, which is a U.S. national stage application under 35 U.S.C. § 371 of PCT Application Number PCT/NZ2015/050053 filed May 13, 2015, which claims the benefit of New Zealand Patent Application Number 624986 filed May 14, 2014. The subject matter of these earlier filed applications is hereby incorporated by reference in its entirety.

TECHNICAL FIELD

This invention relates to a boat support frame loading and unloading apparatus. In various embodiments the invention may be used to load and unload boats from mobile towed support frames, static support frame assemblies, or static support frames implemented in association with another form of vehicle.

BACKGROUND ART

Various applications require boats to be moved to and from a support frame and a body water.

For example road going trailers are commonly used to transport boats overland and to store boats away from a body of water. Boat trailers allow a wide range of different sizes of water vessels to be deployed to and retrieved from bodies of water.

Relatively simple boat trailers rely on the trailer being backed down a boat ramp and partially submerging the trailer. This then allows a boat to be pushed off the trailer with the assistance of a number of passive roller elements. When the boat is to be retrieved it must be accurately aligned with the trailer to allow a winch system to be used to pull the boat back over the trailer rollers.

Winch based retrieval systems are difficult for some users to employ effectively, while also requiring the boat and the trailer to be precisely aligned with the winch rope secured to a strong point at the bow of the boat. Furthermore, the loading of boat trailers with winches will normally result in the boat user getting wet.

Winch based systems—whether they be manually cranked or driven by an electric motor—are also relatively slow. It is not uncommon for winching operations to take five or more minutes to load a boat depending on boat ramp angle. Gearing systems are also employed with winches used to retrieve relatively heavy boats, allowing the winch to a load the boat but at the cost of significantly slower loading speeds.

Boat trailers must also be at least partially submerged for relatively long periods to allow for winch based loading operations. This approach will expose the trailer frame and its associated components to water (and frequently saltwater) which can damage the trailer components. Salt water exposure in particular is very common for boat trailers and has a highly corrosive effect on metal components.

Attempts have been made to address these issues through providing boat loading systems which incorporate powered loading rollers.

For example, US patent specification U.S. Pat. No. 4,363,590 discloses the provision of an electric motor mounted to the rear of a boat trailer frame. This motor is connected to a rear mounted powered roller system via a system of drive shafts and gears. The electric motor rotates the roller system to launch a boat from the trailer or to retrieve a boat which has had its bow pushed up into contact with the powered rollers.

Although improving on winch based loading operations the approach described by U.S. Pat. No. 4,363,590 normally ends up submerging the electric motor used in water, and salt water in many cases. This approach can drastically shorten the useful lifespan of the electric motor and will promote accelerated metallic corrosion of the drive system components.

Furthermore the active or working components of this loading system are difficult to access for repair and maintenance operations. These problems are aggravated by this loading systems use of a relatively complicated power transmission system which again must be maintained regularly to ensure effective and reliable operation of the device.

An alternative powered roller based loading system is disclosed in the applicant's own PCT patent specification, published as WO2013/191570. This document discloses the provision of a number of powered rollers mounted to the rear of a boat trailer, with rotation of the rollers being driven by a hydraulic, pneumatic or electric motors mounted to the outside end of each powered roller.

Although positioning the motor used in an accessible location, the powered roller loading system disclosed in this document causes problems when a variety of boats with different hull shapes and designs are to be loaded. Depending on the hull chine shape involved there is the potential for the upper sections of the hull to impact against the powered roller drive motor as the boat is drawn on to the trailer.

In addition to needing to accommodate various hull chine shapes a boat frame loading and unloading systems must also accommodate hull design features such as planing or lifting lines and lifting strakes. These features are provided in various configurations and dimensions to assist in lifting the hull in the water when underway.

Lifting strakes are usually accommodated by providing a soft deformable covering material over the trailer rollers to prevent damage to the hull as is drawn on to or off the trailer. However this approach is not particularly effective as the lifting strakes create a local point load on the roller which compresses the cover material and can still allow hull damage to occur.

The applicant's own PCT patent specification publication WO2013191570 also attempts to address this problem in a limited fashion with a set of static roller positions capable of flexing to a limited degree. Although more effective than just deploying a deformable cover roller material, this approach is still only effective for a limited number of hull design configurations.

A similar set of operational constraints and performance issues are also experienced with other forms of boat loading and unloading systems.

For example dry dock facilities are used to retrieve boats from bodies of water, generally for the purposes of repairs and maintenance. Dry docks can rely on water locks and large water pumping systems or alternatively Invariably the components used in the implementation of a dry dock require a significant financial investment.

Smaller scale dock facilities are also desirable in boat house facilities which in practice function as garages for boats formed as standalone structures or as part of shorefront houses. It is common for a lifting cradle to be used in these applications, where a support frame is submerged and then lifted up underneath a boat driven into the house. These submergible frames are relatively large complicated pieces of equipment which must be precisely aligned with a boat before it can be lifted from the water by a high power drive system.

Drive on pontoon dock based facilities are also used to remove small and medium size boats from bodies of water. These systems consist of floating platforms tethered to static sites and provide an upper deck surface which a vessel can force its way on to as its bow depresses the leading edge of the dock. Although providing a portable lightweight loading system for a static location, these systems provide little control to the user during loading operations. The user must force their boat up onto the floating deck of the dock using the power of their own boat only—with too fast an approach resulting in overshooting the deck and significant damage to the boat.

In some instances there is also the need to launch and retrieve a boat from a larger water vessel which acts as a mother ship. For example large luxury water craft—commonly known as 'super yachts'—can be used to launch and retrieve a variety of smaller water vessels such as smaller power boats, jet skis or tender vessels.

Again in these applications some form of boat support frame needs to be loaded and unloaded, with the problems discussed above being aggravated by the support frame also moving around on the surface of the water while a boat is to be loaded. In such applications it is advantageous to load a boat as quickly as possible while avoiding the use of winch systems which could be potentially dangerous to their users.

It would therefore be of advantage to have improvements over the prior art which addressed the above issues or at least provided the public with an alternative choice. In particular, it would be of advantage to have a fast usable boat loading and unloading system capable of working with a wide range of sizes and weights of boats. A boat loading and unloading system with a robust design which protected its active components from damage and water exposure would also be of advantage, as would a system with flexible operational characteristics capable of working a variety of hull designs without damage.

DISCLOSURE OF INVENTION

According to one aspect of the present invention there is provided a boat support frame loading and unloading apparatus configured to draw a boat on to and off a boat support frame, the boat support frame having a loading end and a terminal end opposite to the loading end, the apparatus including at least one roller assembly mounted to the support frame adjacent to the loading end of the support frame, said at least one roller assembly incorporating at least one roller element, and at least one drive mechanism configured to rotate one or more roller elements to draw a boat onto and off the support frame through the loading end of the support frame, wherein a roller assembly includes a hull contact surface formed by a flexible belt which has a circumference greater than the circumference of the said at least one roller element incorporated into the roller assembly.

According to another aspect of the present invention there is provided a boat support frame loading and unloading apparatus configured to draw a boat on to and off a boat support frame, the boat support frame having a loading end and a terminal end opposite to the loading end, the apparatus including at least one roller assembly mounted to the support frame adjacent to the loading end of the support frame, and at least one drive mechanism configured to rotate one or more roller elements of said at least one roller assembly to draw a boat on to and off the support frame through the loading end of the support frame, wherein said at least one roller assembly defines an exterior hull contact surface and has an axis of rotation which rotates the hull contact surface in contact with a boat hull, the drive mechanism used to rotate a roller element being positioned co-axially with the roller element axis of rotation and surrounded by the hull contact surface of the roller assembly.

According to another aspect of the present invention there is provided a boat support frame loading and unloading apparatus configured to draw a boat on to and off a boat support frame, the boat support frame having a loading end and a terminal end opposite to the loading end, the apparatus including at least one roller assembly mounted to the support frame adjacent to the loading end of the support frame, and at least one drive mechanism configured to rotate one or more roller assemblies to draw a boat onto and off the support frame through the loading end of the support frame, wherein a roller assembly includes one or more roller elements distributed along the length of the roller assembly, said roller element defining at least a portion of the roller assembly hull contact surface, the positioning of each roller element being adjustable within the loading and unloading apparatus.

According to a further aspect of the present invention there is provided a boat support frame loading and unloading apparatus substantially as described above wherein a roller assembly includes two or more roller elements distributed along the length of the roller assembly, said roller elements defining the roller assembly hull contact surface, the positioning of the roller elements relative to each other being adjustable within the roller assembly by the insertion or removal of at least one spacing element located between adjacent roller elements.

According to yet another aspect of the present invention there is provided a boat support frame loading and unloading apparatus substantially as described above which includes a mounting bracket associated with each roller assembly, said mounting bracket being engaged with opposite ends of the roller assembly and including a telescoping support shaft extending the length of the roller assembly, the length of the support shaft being adjustable to accommodate modifications in the length of the roller assembly.

According to another aspect of the present invention there is provided a boat support frame loading and unloading apparatus substantially as described above which includes a carrier arm arranged to connect the loading and unloading apparatus to a boat support frame, one end of the carrier arm being connected to a mounting bracket associated with a roller assembly, the connection position of the carrier arm to the mounting bracket being adjustable to adjust the position of the roller assembly within the loading and unloading apparatus.

According to a yet further aspect of the present invention there is provided a method of operating a loading and unloading apparatus substantially as described above to load a boat to a support frame within a maximum acceptable time period, characterised by the steps of:
  i. determining the weight and length of the boat to be loaded, and
  ii. calculating the force required to load the boat within the maximum acceptable time period
  iii. calculating the torque required to load the boat using the calculated force and a measurement of the diameter of the roller assembly or assemblies iv. calculating the operational speed required of the roller assembly drive mechanism or mechanisms to develop the calculated torque
v. operating the drive mechanism or mechanisms at the calculated operational speed to load the boat within the maximum acceptable time period.

Preferably the above method also includes the preliminary step of determining the hull material type. For example, this method may involve the reception of preliminary information regarding whether a hull is formed from a metal alloy, GRP or other forms of compounds.

According to a yet another aspect of the present invention there is provided a method of specifying the construction of a loading and unloading apparatus substantially as described above to load a boat to a support frame within a maximum acceptable time period, characterised by the steps of:
i. determining the weight and length of the boat to be loaded, and
ii. calculating the force required to load the boat within the maximum acceptable time period
iii. calculating the torque required to load the boat using the calculated force and a measurement of the diameter of the roller assembly or assemblies to be constructed
iv. calculating the operational speed required of the roller assembly drive mechanism or mechanisms to develop the calculated torque
v. specifying the configuration of the drive mechanism required to operate at the speed calculated to load the boat within the maximum acceptable time period.

Preferably the above method also includes the preliminary step of determining the hull material type. For example, this method may involve the reception of preliminary information regarding whether a hull is formed from a metal alloy, GRP or other forms of compounds.

The present invention is arranged to provide a loading and unloading apparatus used in conjunction with a boat support frame. The boat support frames employed with the invention define a loading end and a terminal end, where a boat is loaded in to and on to the frame through the loading end with the bow of the boat eventually ending up adjacent to the terminal end of the frame.

The invention may be used with a range of different types of the support frames, such as for example, those implemented by road going trailers, or alternatively with support frames used in dry dock applications, boat houses, floating pontoon docks or with larger water vessels.

Reference in general throughout this specification will be made to the invention being installed on or forming part of a road going boat trailer. However those skilled in the art will appreciate that the invention may be used with any number of alternative forms of boat support frame and references to its use with boat trailers in isolation should not be seen as limiting.

Referenced in general throughout this specification will also be made to the invention providing a loading apparatus. Again those skilled in the art will appreciate that the invention can obviously be employed to unload a boat from a support frame in addition to loading boats to the same frame.

Reference in general throughout this specification is also made to the invention being used to load and unload boats. Those skilled in the art will appreciate that the term boat encompasses a wide range of forms of water vessels from large single hull vessels, multihull vessels or smaller craft such as jet skis.

The invention is implemented by providing one or more roller assemblies in association with one or more drive mechanisms. A roller assembly defines or includes at least one roller element in addition to a hull contact surface which when rotated by a drive mechanism acting on a roller element will engage with the hull of a boat to load or unload the boat from a trailer.

In various embodiments the hull contact surface can have a substantially cylindrical form with a central axis of rotation, and may be fixed in place on or be formed by the exterior surface of one or more roller elements integrated in a roller assembly. Activation of a drive mechanism associated with the roller element will cause the hull contact surface to bear against a boat hull, with rotation of the roller element urging the boat on or off the associated boat support frame.

In other embodiments a hull contact surface may be formed from a loop or belt of flexible material with a greater circumference than that of the roller element. In these cases a contact surface may form a conveyer belt loop which is tensioned or shaped by a further rotor element located distal to a driving roller element. Activation of a drive mechanism associated with a roller element will rotate the hull contact conveyer belt surface around the roller element with one side of the belt surface engaging with the hull of a boat to draw the boat onto or off the boat support frame.

The invention's roller assembly or assemblies are mounted to the boat trailer adjacent to the loading end of the trailer. This configuration of the invention allows a boat to be loaded simply by its operator positioning the bow of the boat into contact with the roller assembly. The drive mechanism can then be activated to allow the roller assemblies hull contact surface to rotate against and pull the boat on to the trailer. The reverse of this operation can also be run to launch a boat from the trailer.

Those skilled in the art will appreciate that various arrangements and configurations of roller assemblies and drive mechanisms may be employed in different embodiments of the invention.

For example in one alternative embodiment a trailer frame may be provided with a single roller assembly, while in other embodiments multiple sets of roller assemblies may be deployed to the rear loading end of the trailer.

Furthermore in some embodiments each roller assembly provided may be rotated by a single dedicated drive mechanism, while in other embodiments multiple drive mechanisms may be provided for a roller assembly.

Referenced in general throughout this specification will however be made to the invention being implemented in a preferred embodiment to provide multiple roller assemblies with a boat trailer where each roller assembly is rotated or powered by a single drive mechanism. Again however those skilled in the art will appreciate that alternative configurations of the invention are also possible.

In a preferred embodiment a drive mechanism may be provided by a hydraulic motor. Hydraulic motors are relatively simple drive systems, needing only to be supplied with pressurised hydraulic fluid to function effectively. These types of drive mechanisms can also function to deliver high torques to the hull contact surface, allowing heavy boats to be loaded easily and quickly.

Reference in general throughout this specification will also be made to the invention employing drive mechanisms formed from hydraulic motors. Again however those skilled in the art will appreciate that alternative forms of drive systems may also be employed with the invention in alternative embodiments.

As referenced above, in various embodiments a hull contact surface may be formed from a loop or belt of flexible material with a greater circumference than that of the roller element. In such embodiments the hull contact surface belt will be free to move over an associated roller element used to impart a rotary motion to the hull contact surface belt.

In such embodiments the roller assembly providing the hull contact surface belt can also include a tension rotor which is located distal from a roller assembly used to impart rotary motion to the belt. A tension rotor can be formed by any appropriate component which is able stretch or tension the belt and also rotate and guide the motion of the hull contact belt back towards a driving roller element.

For example in one such embodiments a tension rotor may be provided by a simple passive cylindrical roller which tensions and shapes the hull contact surface belt and guides its motion back towards a driving roller element.

Furthermore, in alternative configurations a tension rotor may be provided by a further roller element of the same roller assembly. In these instances the contact surface belt can be shaped and tensioned by at least two roller elements which are aligned along separate rotational axes and which can be rotated by one or more drive mechanisms.

In various embodiments where a hull contact surface belt is provided by a roller assembly one or more guide rollers may also be provided by the same roller assembly. In such embodiments one or more guide rollers may be positioned between a tension rotor and a driving roller element to guide the motion of the belt as it rotates over the roller element and tension rotor. As is the case with the tension rotor, a guide roller may be formed by a passive cylindrical roller, or could potentially be driven to add to the rotary motion imparted to the hull contact surface belt. Those skilled in the art will appreciate that one or more guide rollers may be used to control the shape of the belt while also controlling the route it travels between tension rotor and roller element.

In various embodiment the invention is arranged to position the drive mechanism used to rotate this roller assembly coaxially with the axis of rotation of the cylindrical hull contact surface while also surrounding the drive mechanism with the hull contact surface.

As referenced above, in various embodiments each roller assembly provided by the invention can define or incorporate a substantially cylindrical exterior hull contact surface where the roller has an axis of rotation which rotates the hull contact surface into contact with a boat hull.

In such embodiments the drive mechanism used to rotate a roller element may be located within the interior of one or more roller elements, enclosing the drive mechanism within the substantially cylindrical form of the hull contact surface. The drive mechanism is therefore positioned at a location which prevents it from being impacted by the hull of a boat being loaded, but also retains this component in a readily accessible location which is unlikely to be submerged for long periods of time.

However, in other alternative embodiments where a hull contact surface belt is provided by a roller assembly the entire drive mechanism used may not necessarily be enclosed within a roller element. In these embodiments the roller assembly can incorporate a tension rotor which draws out extends and tensions the hull contact surface belt to form or define a substantially flat or plane like surface from one side of the belt to be placed in contact with the hull of a boat. The combination of the tension rotor and roller element will therefore form a flat drive plane in the hull contact surface belt.

In various preferred implementations of such embodiments the drive mechanism and its associated drive shaft may be positioned so that the rotational axis of the driveshaft is not aligned with the flat drive plane of the hull contact surface belt. For example in some embodiments a guide roller may be provided with a roller assembly to vertically offset the drive plane of the hull contact surface belt from the drive mechanism and its associated driveshaft. In such embodiments a guide roller may be used to lift the hull contact surface belt upwards before it forms such a drive plane, leaving the drive mechanism position below where the drive assembly contacts the boat hull. This arrangement will therefore vertically offset the drive mechanism from the drive plane and position the drive mechanism at a location which prevents it from being impacted by the hull of a boat being loaded.

In some embodiments the loading apparatus includes a mounting bracket associated with each roller assembly. This mounting bracket may be used in embodiments where the roller elements are aligned along the same axis of rotation.

In such embodiments this mounting bracket is engaged with the opposite terminal ends of the roller assembly and includes a support shaft which extends the length of the roller assembly. This support shaft runs along the length of the roller assembly in parallel with and adjacent to the roller assembly, with the ends of the mounting bracket connected to support shaft, enclosing the terminal ends of the roller assembly.

In preferred forms of this embodiment the mounting bracket support shaft may be implemented with a telescoping form to allow the length of the support shaft be adjusted to accommodate modifications in the length of the roller assembly. The length of the mounting bracket may therefore be adjusted as required depending on the length and configuration of the roller assembly to be employed in a particular embodiment.

In a preferred embodiment a mounting bracket may be engaged with a support frame through the provision of an intervening carrier arm. This carrier arm may extend from the mounting bracket to position a roller assembly adjacent to the loading end of the frame.

Preferably one end of the carrier arm is connected to a mounting bracket associated with a roller assembly, where the connection position of the carrier arm to the mounting bracket can adjustable to adjust the position of the roller assembly within the loading and unloading apparatus.

In a further preferred embodiment a carrier arm may be connected to the support shaft of the mounting bracket by way of a sliding connection sleeve. This sleeve may be fixed to the end of the carrier arm while being arranged to slide up and down the length of the support shaft. A variety of different forms of locking systems—such as for example a bearing screw or similar element—may then be engaged to hold the end of the mounting bracket at a particular point on the mounting bracket support shaft.

In yet other embodiments where a roller assembly provides a hull contact surface belt the various components of a roller assembly may be mounted on and positioned by a roller assembly chassis. This chassis can act as a mounting frame which also assisting in the mounting of the roller assembly to the associated boat support frame.

In preferred forms of such embodiments the exterior sidewalls and/or exposed upper surfaces of the roller assembly chassis may be coated in a deformable resilient guard material. This guard material can provide a protective layer over components of the chassis which may damage the hull of a boat being loaded or unloaded as it moves over the chassis. For example in some embodiments a guard material formed from a soft plastic or rubber may be used to coping upper edges and exterior sides of the roller assembly chassis.

In such embodiments the chassis of a roller assembly may be mounted to a boat support frame through the use of an intervening mounting post.

This mounting post can be connected to the roller assembly chassis by an intervening longitudinal pivot connector engaged with a lateral pivot connector, the longitudinal pivot connector and lateral pivot connector each being arranged to rotate about a different axis of rotation. In such embodiments the axis of rotation of the longitudinal pivot connector can be substantially perpendicular to the axis of rotation of the lateral pivot connector.

This arrangement of the mounting post and associated pivot connectors can therefore allow the roller assembly some freedom of movement to sit at a complementary angle to the hull of a boat being loaded or unloaded. Each of the lateral and longitudinal pivot connectors can allow the roller assembly and associated hull contact surface belt to tilt forwards, backwards, or side to side to engage with a boat hull.

In some embodiments where a roller assembly provides a hull contact surface belt the mounting post may also include an orientation biasing element. This orientation element can be used to place the mounted drive assembly and in a preferred initial loading orientation when the boat support frame is unloaded. Preferably in such instances the hull contact surface belt may be orientated so that the end of the belt adjacent to the loading end of the frame is lower than the opposite end of the belt. This initial loading orientation will therefore present a steeply angled drive plane of the hull contact surface belt to the incoming bow of a boat. As boat bows tend to angle upwards steeply, this orientation optimises the surface area of the hull contact surface belt immediately in contact with the hull and capable of engaging with and pulling the hull on to the support frame.

In some implementations of these embodiments an orientation biasing element may be formed from a spring or other similar component. A spring can provide the necessary angle to the hull contact surface belt when installed between a roller assembly chassis and associated mounting post. Once the roller assembly is loaded this spring element will be compressed or tensioned and the roller assembly will be able to adjust its orientation to suit that of the incoming or outgoing profile of the boat hull.

In yet other implementations and orientation biasing element may be formed by a similar deformable resilient structure such as for example a dense foam rubber or plastic block or shim. This shim of resilient material can be positioned between the roller assembly chassis and mounting post to initially urge the roller assembly into a desired initial loading orientation. The weight of a boat being loaded or loaded will then compress the resilient shim and allow the roller assembly to adjust its orientation to suit that of the hull on the frame.

In yet another implementation this biasing element may also be formed by a drive mechanism associated with the roller assembly. In such embodiments the drive mechanism may be is positioned orientated towards the loading end of the frame and at one end of the roller assembly, with the weight of the drive mechanism being used to bias the roller assembly into the desired initial loading orientation.

In some embodiments the hull contact surface of a roller assembly is formed by or has a fixed connection to one or more roller elements. These roller elements are in turn engaged with the rotating components of a drive mechanism thereby allowing the drive mechanism to rotate the hull contact surface. For example in one preferred form of this embodiment a drive mechanism formed by a hydraulic motor may extend a rotating driveshaft along the interior of a roller element, with the roller element being connected to this driveshaft to allow for rotation of the whole contact surface provided by the roller element.

Preferably a roller element may have a substantially cylindrical form with a hollow central region running the length of the roller element. This hollow central region may be used in preferred embodiments to position and accommodate at least a portion of a drive mechanism.

In some embodiments where roller elements are aligned along the same axis of rotation a roller element may include a deformable or resilient cover material which is used to contact the hull of a boat being loaded.

For example in one embodiment a dense cover layer of elastomeric material may be provided as part of a roller element.

In yet another of these embodiments the outer surface of a roller element may be formed by portions of an inflatable bladder used to contain a volume of liquid, gel, or pressurized gas. This form of bladder can therefore deform around and conform to the shape of a hull passing over the roller element, providing a high degree of surface area contact to the hull while minimising the chance of the hull being damage by contact with the roller assembly.

In yet further embodiments the where a hull contact surface belt is provided by a roller assembly a roller element may be provided with a substantially cylindrical form with the exterior of the form defining a plurality of gripping projections. These gripping projections may assist the roller element in gripping the inside surface of the hull contact surface belt and imparting a rotary motion.

In embodiments where a hull contact surface belt is provided by a roller assembly the flexible loop of material used may also have various features defined on its surfaces. For example, in some embodiments the inner surface of the belt which contacts a roller element may define a plurality of gripping projections adapted to engage with the roller element. In other—or potentially the same—embodiment the otter surface of the belt which contacts a boat hull may define a plurality of gripping projections adapted to engage with the hull of a boat.

A hull contact surface belt used in such embodiments may also be formed by a variety of materials. For example in various embodiments this belt may be formed from any one or combination of rubber, PVC, thermoplastic elastane, thermoplastic urethane, polyurethane and/or neoprene.

Those skilled in the art will appreciate that in various embodiments a roller assembly may be formed from one, two or potentially more distinct roller elements depending on the application in which the invention is employed. Furthermore in some embodiments or the roller elements of a roller assembly may be rotated by a single drive mechanism, whereas in other embodiments different roller elements of the same assembly may be rotated by separate drive mechanisms.

In yet other embodiments roller elements making up a roller assembly may not be aligned along a common axis of rotation. For example in instances where the hull contact surface of a roller assembly is formed by a loop or belt of flexible material with a circumference greater than that of a roller element, the roller elements may be displaced from each other to separate the axis of rotation of each roller element. In such embodiments the roller elements can act to tension the hull contact conveyer belt and to drive the motion of the conveyer belt.

In some embodiments where roller elements are aligned along the same axis of rotation the location of a roller element may be adjusted to various positions along the length of the roller assembly, or relative to the entire loading and unloading apparatus. By allowing the position of the inventions roller elements to be adjusted this allows the loading apparatus to be configured to load a wide variety of hull shapes with various design features.

For example, in one embodiment where a single roller assembly includes a plurality of axially aligned roller elements, the positioning or relative spacing of these roller elements may be adjusted by the insertion or removal of one or more spacing elements. The spacing elements may be deployed along the length of the axially aligned roller assembly and be located between the adjacent roller elements or at the ends of the roller assembly. Spacing elements can have a form or profile with a substantially smaller radius than that of the roller elements. The spacing element therefore defines a cavity in the substantially cylindrical profile of the roller assembly which is capable of receiving features such as planning strakes projecting from the hull of a boat.

In yet other embodiments the position of a single roller element making up a roller assembly may be adjusted to accommodate variations in hull design and form. In such embodiments the position at which a carrier arm is engaged with the roller assembly mounting bracket can be adjusted to in turn adjust the relative position of the roller element in relation to the boat support frame and hence what portions of the hull of a boat being loaded will be contacted.

Those skilled in the art will also appreciate that roller assemblies composed of multiple axially aligned roller elements can also be positioned using the connection point of a carrier arm to the mounting bracket involved. Again the position of these roller elements may be adjusted in this way to adjust the relative position of the roller elements in relation to the boat support frame and therefore which portions of the hull of a boat will be contacted.

In some embodiments a lifting structure may be provided in combination with a roller assembly and any associated drive mechanism engaged with this roller assembly. A lifting structure may be deployed between the boat support frame and roller assembly and can be used to adjust the relative vertical position or location of a roller assembly when compared to the boat support frame.

A lifting assembly can therefore be used to adjust the angle which a contact surface makes with the hull of a boat as it is loaded or unloaded. Furthermore, a lifting structure may also be used to ensure that the weight of a boat bears against the hull contact surface with enough force to frictionally engage the boat with the hull contact surface. Those skilled in the art will appreciate that this lifting assembly may be used in a range of embodiments of the invention, be it to lift and lower a roller assembly with axially aligned roller elements, or a roller assembly which provides a hull contact surface belt.

In some embodiments a boat loading frame may include further sets of passive rollers deployed towards the middle and terminal end of the frame. These additional mid and fore passive rollers allow a boat to be rolled into its final loaded position on the frame, but will also lighten the load applied by the boat to a roller assembly as the boat moves towards the terminal end of the frame. As less weight is borne by a roller assembly its ability to grip and push against the hull of a boat is diminished. A lifting structure can therefore be used to lift the boat hull up and off these additional passive rollers for a longer portion of the loading operation time.

In a preferred embodiment a lifting structure may include or be formed from a compression element. A compression element provided in this role can be arranged to both lift an associated roller assembly when not loaded by the weight of a boat, and also lower the same roller assembly in a controlled manner as a boat is loaded towards the terminal end of the frame. This compression element may in some embodiments have a resilient character, ensuring that the associated roller assembly can be lifted above the main body of the boat loading frame prior to any boat loading operations.

For example in one embodiment a lifting structure may incorporate a compression element formed by a spring. The resilient character of this spring will therefore raise an associated roller assembly upwards when not loaded by the weight of the boat, while lowering the roller assembly in a controlled manner as more weight is applied to it by a boat during a loading operation.

However in a preferred embodiment a compression element may be formed by a hydraulic or pneumatic ram assembly. In such embodiments a ram chamber may be charged with pressurised gas or liquid to raise an associated roller assembly prior to the loading operation. During loading the hydraulic or pneumatic fluid involved can be allowed to exit from the ram chamber at a controlled flow rate, thereby allowing the roller assembly to be lowered at a controlled rate during the boat loading operation.

BRIEF DESCRIPTION OF THE DRAWINGS

Example embodiments of the invention are now discussed with reference to the drawings in which:

FIGS. 2 and 3 show exploded and assembled views of a roller assembly and associated mounting bracket as provided in two further embodiments, FIGS. 9a, 9b and 9c show top, side and end view of one of the roller assemblies and drive mechanisms of the embodiment of FIG. 8, and FIGS. 10a through 10d show front and rear perspective views and underside views of the roller assembly and drive mechanism of the embodiment of FIGS. 9a through 9c, and FIG. 11 shows a side cross-section view of the roller assembly and drive mechanism illustrated with respect to FIGS. 9 and 10.

BEST MODES FOR CARRYING OUT THE INVENTION

Figure 1A:
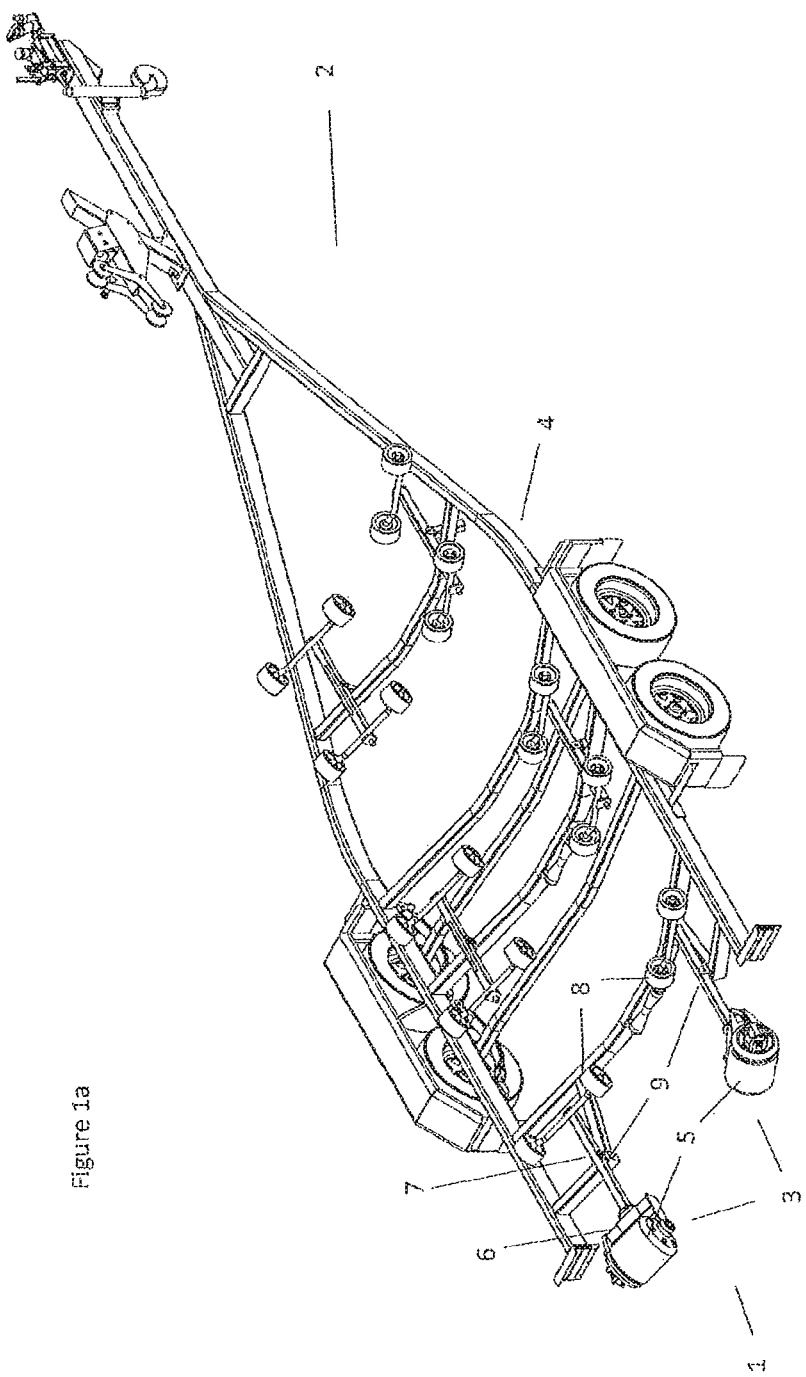
FIGS. 1a and 1b show perspective views of the invention implemented in two different embodiments to load and unload boats from a road going trailer.
Figure 1B:
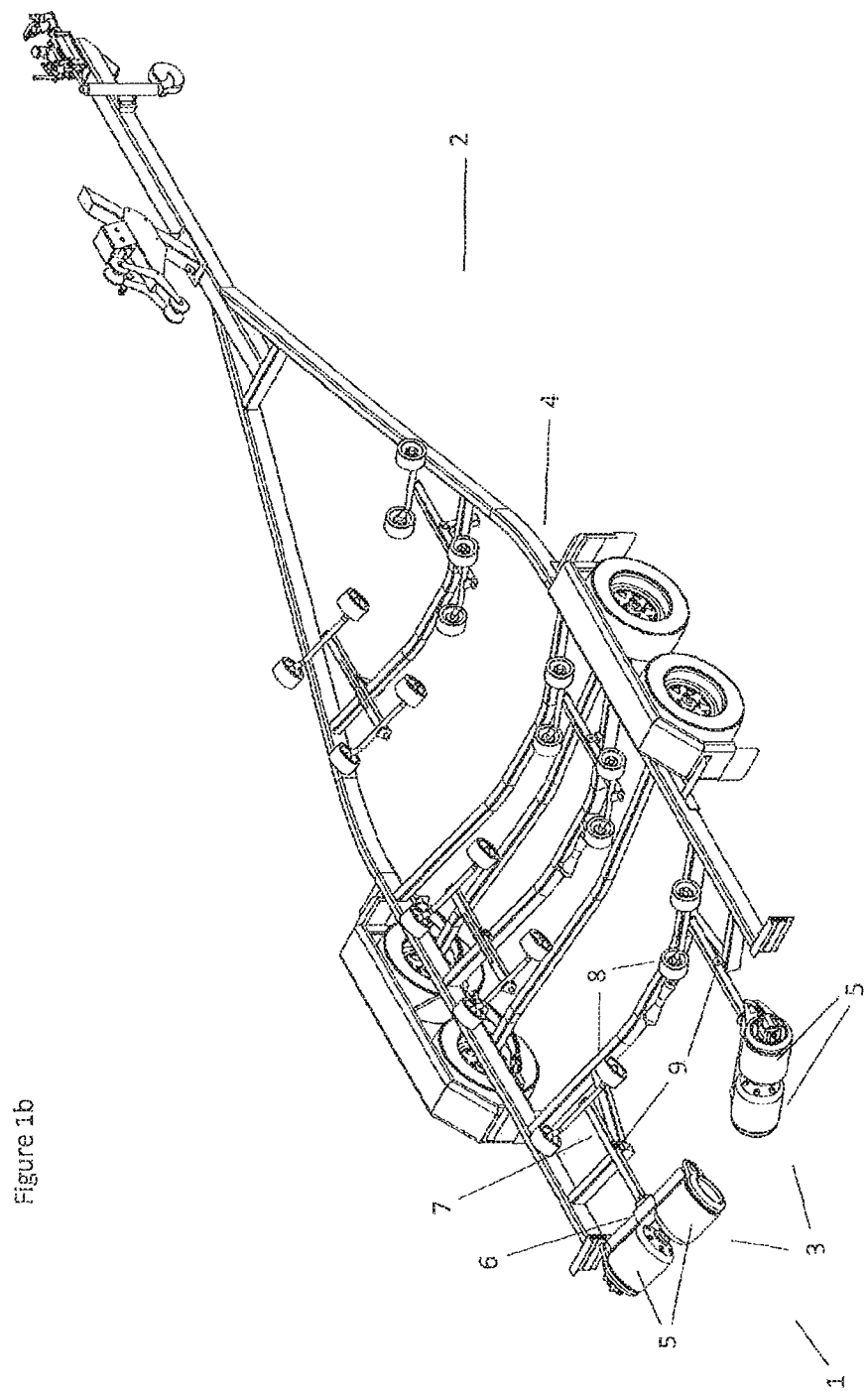

FIGS. 1a and 1b shows a perspective view of the invention used in two different embodiments to implement a loading and unloading apparatus 1 for a boat support frame formed from a road going trailer 2.

In this embodiment the invention is formed by a number of roller assemblies 3 positioned to the rear or loading end of the trailer. The roller assembles 3 are deployed with a symmetrical arrangement centered around the midline of the trailer frame 4.

In the embodiment shown with respect to FIG. 1a the roller assemblies 3 include a single roller element 5, while in the embodiment of FIG. 1b a pair of adjacent aligned roller elements 5 are provided.

Each roller assembly is enclosed by the ends of a mounting bracket 6 with each mounting bracket 6 connected to a carrier arm 7 to locate the roller assembly 3 in place on the trailer frame 4. The same carrier arm 7 is also used to deploy a passive roller 8 and provides the invention with a pivoting 'wobble roller' arrangement with a pivoting connection 9 to the trailer frame 4. Those skilled in the art will appreciate however that in other embodiments the carrier arm may be directly fixed to a frame and therefore would be unable to move relative to this frame.

Boat loading and unloading operations are completed with the activation of a drive mechanism (not shown) associated with each roller assembly. These drive mechanisms rotate the exterior hull contact surfaces of the roller assemblies to push the stern of a boat off the trailer or to draw the bow of a boat on to the trailer. The hull contact surfaces of each roller assembly continue to rotate until the boat is either launched from the trailer or the bow of the boat comes to rest at the terminal end of the trailer.

FIGS. 2 and 3 show exploded and assembled views of a roller assembly and associated mounting bracket as provided in two further embodiments.

The roller assembly is formed in these embodiments from a pair of roller elements 5 aligned end to end to define the length of the roller assembly 3. The exterior surface of the roller elements forms the hull contact surface 10 of the roller assembly.

Each roller element has a substantially cylindrical form and defines a hollow central region 11. The centre of one of the roller elements is used to accommodate a drive mechanism hydraulic motor 12. Locating the hydraulic motor inside one of the roller elements positions it co-axially with the roller assembly axis of rotation, with the motor being surrounded by the hull contact surface. The hydraulic motor extends a rotating driveshaft 13 which is connected to both the roller elements to impart rotational movement to these components when the motor is activated.

In the configuration of the invention shown with respect to FIG. 2 the roller elements 5 are located immediately adjacent to one another. Conversely FIG. 3 shows the provision of a spacing element 14 between the two roller elements. The spacing element separates the roller elements, creating a void which is able to receive a planeing strake projecting from the hull of a boat. As can also see be seen from FIG. 3 the spacing element also acts as a section of the hydraulic motor's driveshaft, rotating when the motor is activated to transfer the motors rotational energy to the second roller element.

FIGS. 2 and 3 also illustrate the form and arrangement of a telescoping support shaft 15 provided by the mounting bracket 6. As can be seen in each of the exploded views the support shaft is provided by a two or three part arrangement of concentrically nested box section shafts. These nested shafts are slid into and out of one another until the length of the mounting bracket matches that of the roller assembly.

Figure 4:
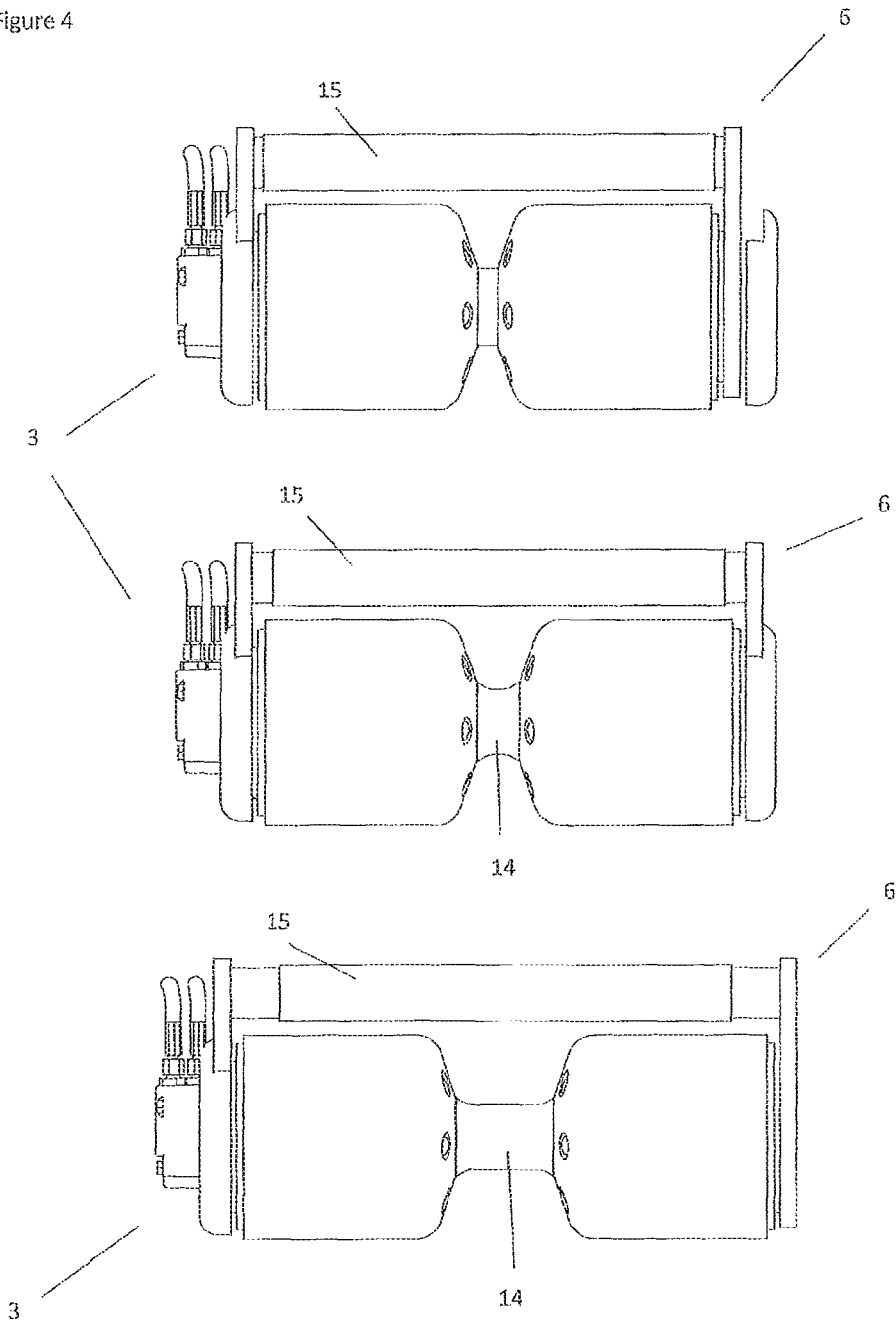
FIG. 4 shows a selection of front views of elements the invention implemented in the embodiment of FIG. 3, each view showing the reconfiguration of the invention to adjust the length and positioning of the roller elements of a roller assembly.

FIG. 4 shows a selection of front views of the invention implemented in the embodiment of FIG. 3. Each of these views show the reconfiguration of the invention to adjust the length and positioning of the roller elements of the roller assembly.

As can be seen from FIG. 4 the length of each roller assembly can be adjusted through the insertion of an intervening spacing element 14 between the two roller elements. The size of the spacing element used will dictate the spacing between the roller elements.

Figure 5A:
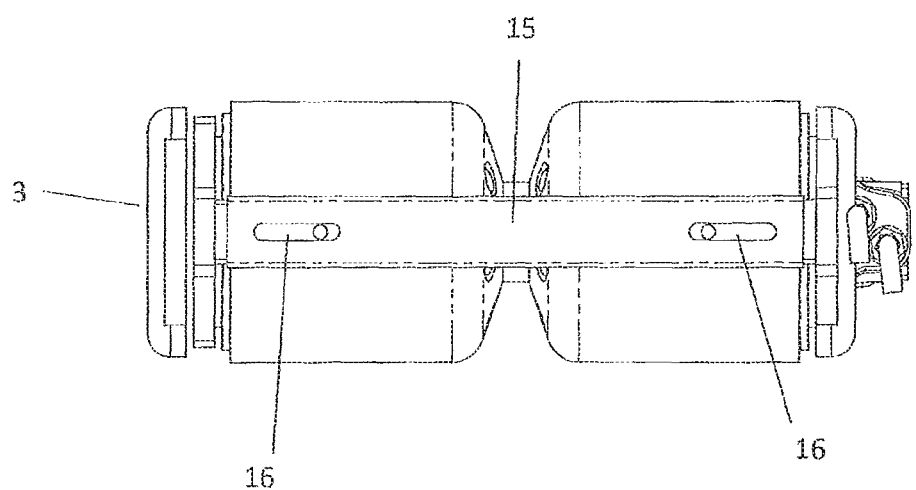
FIGS. 5a and 5b show end and plan views of the roller assembly of FIG. 1b, FIGS. 6a, 6b show a set of perspective views of the roller assembly, connection bracket and carrier arm of the embodiment shown with respect to FIG. 1a, and FIGS. 7a, 7b show a set of perspective views of the roller assembly, connection bracket and carrier arm of the embodiment shown with respect to FIG. 1b
Figure 5B:
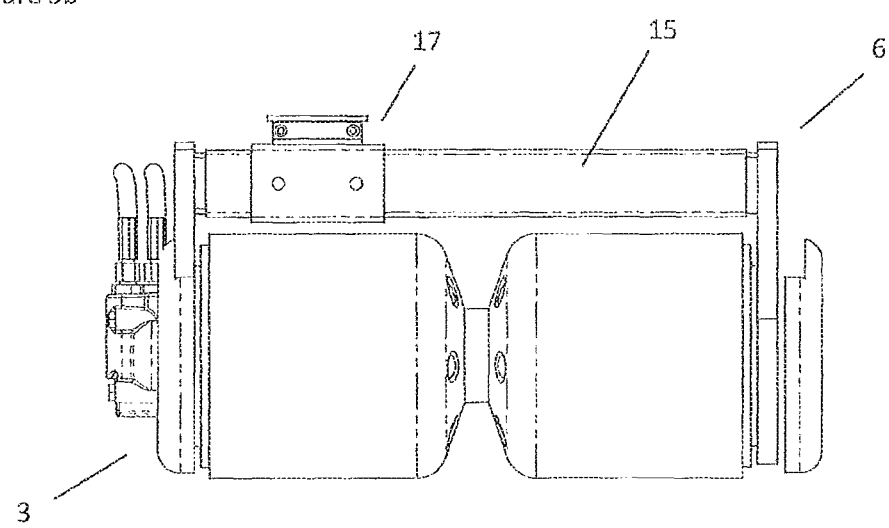

FIGS. 5a and 5b show end and plan views of the roller assembly of FIG. 1b.

FIG. 5a illustrates elements of a locking system used in conjunction with the telescoping support shaft of the mounting bracket. The support shaft is implemented with an arrangement of three complimentary nested box section shafts, with a pair of slots 16 formed near the ends of the outer middle shaft. These slots 16 allow a locking screw, bolt or similar component to engage with the surface of the inner section of the shaft and lock it to the middle section at a selected position.

FIG. 5b illustrates the provision of a sliding connection sleeve 17 used to adjust the connection point of the carrier arm 7 to the support shaft, and hence the position of the roller assembly relative to the trailer frame. As can be seen from FIG. 5b this sleeve encircles the support shaft and is free to connect to carrier arm to it at any position along its length.

Figure 6A:
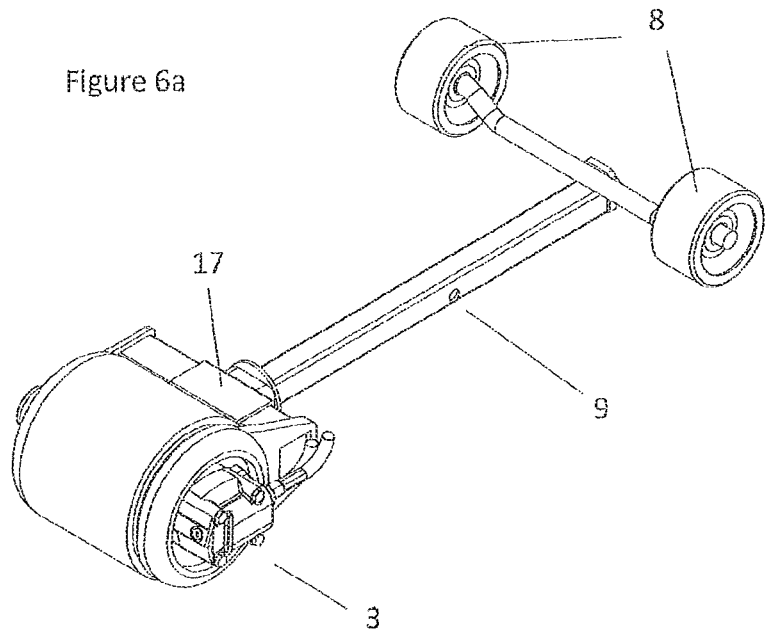
Figure 6B:
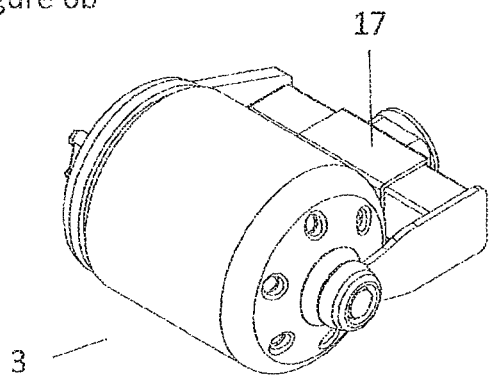
Figure 7A:
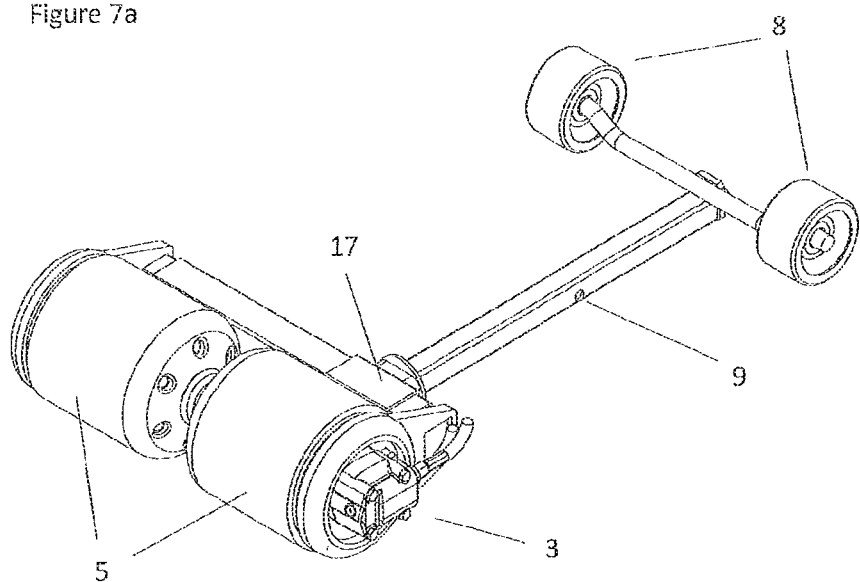
Figure 7B:
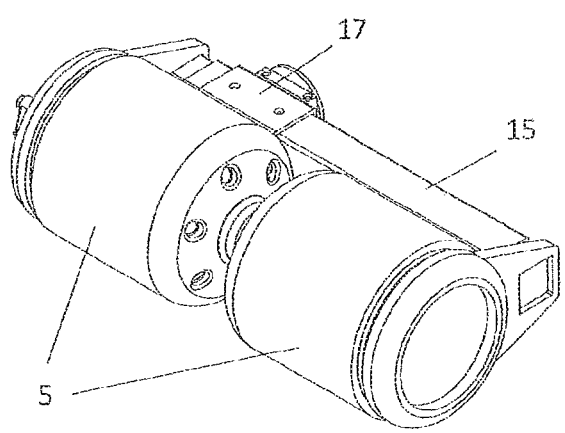

The operation of this sliding connection sleeve is also shown in more detail with respect to FIGS. 6a-6b and FIGS. 7a-7b. FIGS. 6a, 6b show a set of perspective views of the roller assembly, connection bracket and carrier arm of the embodiment shown with respect to FIG. 1a. Conversely FIGS. 7a, 7b show a set of perspective views of the roller assembly, connection bracket and carrier arm of the embodiment shown with respect to FIG. 1b.

As can be seen from these figures the position at which the sliding connection sleeve 17 is locked to the end of the carrier arm 7 will dictate the relative position of the roller assembly 3 to the trailer once connected through the pivoting connection point 9 of the carrier arm.

Figure 8:
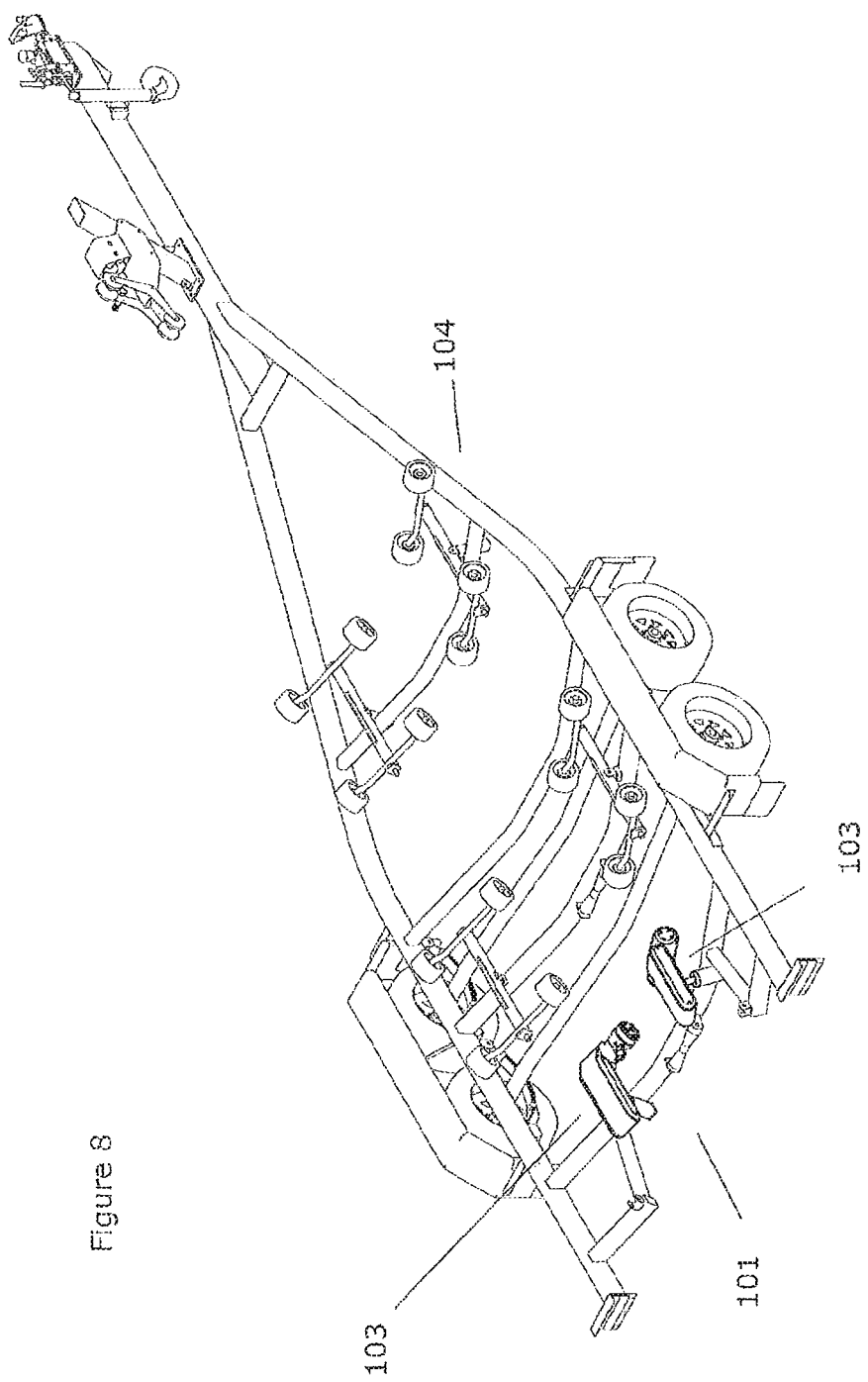
FIG. 8 shows a perspective view of a pair of roller assemblies and associated drive mechanisms deployed on a boat loading road trailer frame in accordance with a further embodiment of the invention.

FIG. 8 shows a perspective view of a boat support frame loading and unloading apparatus 101 as provided by an alternative embodiment of the invention. The apparatus 101 provides a pair of roller assemblies 103 and associated drive mechanisms 112 deployed on a boat loading road trailer frame 104 in accordance with a this embodiment of the invention.

The two roller assemblies 103 are positioned to the rear or loading end of the trailer frame 104. The roller assembles are again deployed with a symmetrical arrangement centered on the midline of the trailer frame.

As can be seen in more detail with respect to FIGS. 9a-c and 10a-d, each of the roller assemblies 103 are formed with a single roller element 105. Each roller element has a substantially cylindrical form with the centre of this form used to accommodate the drive shaft 113 of a drive mechanism, which is provided in this embodiment by a hydraulic motor 112. This arrangement positions the hydraulic motor co-axially with the roller element axis of rotation.

In this embodiment each roller assembly includes a hull contact surface formed by a flexible belt 110 which has a circumference greater than the circumference of the roller element 105. Each hull contact surface belt is free to move over the roller element, with rotation of the roller element imparting a rotary motion to the hull contact surface belt. The direction of rotation imparted to the belt is shown by the longitudinal arrow illustrated by FIG. 9*a*.

The various components of each roller assembly are mounted on and positioned by a roller assembly chassis 118. The chassis aids in defining the path travelled by the hull contact surface belt 110 as it rotates while also providing an attachment mechanism for the roller assembly to the boat loading frame 104.

The exterior sidewalls of the roller assembly chassis are coated in a deformable resilient rubber guard material 119. This guard material provides a protective layer over components of the chassis which may damage the hull of a boat being loaded or unloaded as it moves over the chassis.

As illustrated by FIG. 11, the hull contact surface belt 110 is tensioned or shaped by a further tension rotor located at the opposite end of the chassis to the roller assembly. The tension rotor is formed by a passive cylindrical roller 120 which tensions and shapes the hull contact surface belt 110 and guides its motion back towards the driving roller element 105.

The roller assembly also includes three guide rollers 121 positioned between the tension rotor and driving roller element. As is the case with the tension rotor 120, each guide roller 121 is formed by a passive cylindrical roller which guides the path of the belt through the chassis 118 as it rotates over the roller element 105 and tension rotor 120.

Boat loading and unloading operations are completed with the activation of the drive mechanism 112 associated with each roller assembly 103. These drive mechanisms rotate the hull contact surface belt 110 of the roller assemblies to push the stern of a boat off the trailer 104 or to draw the bow of a boat on to the trailer. The hull contact surface belt of each roller assembly continue to rotate until the boat is either launched from the trailer or the bow of the boat comes to rest at the terminal end of the trailer.

As can be seen from FIGS. 9 and 10 the roller element 105, guide rollers 121 and tension rotor 120 define a substantially flat drive plane 122 on the side of the belt 110 to be placed in contact with the hull of a boat. The guide roller closest to the roller element is used to vertically offset the drive plane of the hull contact surface belt from the drive mechanism 112 and its associated driveshaft 113. This guide roller lifts the hull contact surface belt upwards before it forms the drive plane, leaving the drive mechanism positioned below where the roller assembly contacts the boat hull. This arrangement will therefore position the drive mechanism at a location which prevents it from being impacted by the hull of a boat being loaded.

The relative position or orientation of each roller assembly and associated drive mechanism can also be modified in this embodiment through the mounting systems used to connect these components to the boat loading trailer frame.

The embodiment shown with respect to FIGS. 8 through 13 illustrates the use of a mounting post 123 to connect each drive assembly 103 to the trailer frame 104.

The mounting post 123 is connected to the roller assembly chassis by an intervening longitudinal pivot connector 124 engaged with a lateral pivot connector 125. Each pivot connector 124, 125 is arranged to rotate about a different axis of rotation to adjust the range of motion afforded to a roller assembly and the contact angle it makes with various areas of a boat hull. In the embodiment illustrated the axis of rotation of the longitudinal pivot connector is perpendicular to the axis of rotation of the lateral pivot connector.

This arrangement allows the roller assembly to sit at a complementary angle to the hull of a boat being loaded or unloaded. Each of the lateral and longitudinal pivot connectors 124, 125 can allow the roller assembly and associated hull contact surface belt to tilt forwards, backwards, or side to side to engage to engage the greatest surface area of the belt with a boat hull. The freedom of orientation provided to the drive assembly is shown by the longitudinal pivot arrow of FIG. 9*b* and the transverse pivot arrow of FIG. 9*c*.

In some embodiments an orientation biasing element (130 in FIG. 9*b*) is provided to place the roller assembly or assemblies in a preferred initial loading orientation when the boat support frame is unloaded. Preferably in such instances the hull contact surface belt may be orientated so that the end of the belt adjacent to the loading end of the frame is lower than the opposite end of the belt. This initial loading orientation will therefore present a steeply angled drive plane of the hull contact surface belt to the incoming bow of a boat. As boat bows tend to angle upwards steeply, this orientation optimises the surface area of the hull contact surface belt immediately in contact with the hull and capable of engaging with and pulling the hull on to the support frame.

In some implementations of these embodiments an orientation biasing element 130 may be formed from a spring or other similar component. A spring can provide the necessary angle to the hull contact surface belt when installed between a roller assembly chassis 118 and associated mounting post 123. Once the roller assembly is loaded this spring element will be compressed or tensioned and the roller assembly will be able to adjust its orientation to suit that of the incoming or outgoing profile of the boat hull.

In the embodiment shown with respect to FIGS. 8 to 12 a lifting structure 126 is provided in combination with the support post. This lifting structure incorporates a compressible element formed by a hydraulic ram 127 which is located within a rectangular pressure housing 128 which also defines the body of the mounting post. The ram is free to move up and down inside the pressure housing but is locked in a fixed orientation within the housing by a rectangular collar.

The lifting structure is therefore deployed between the boat support frame and roller assembly and is used to adjust the relative vertical position or location of the roller assembly when compared to the boat support frame. In use the pressure housing 128 is charged with pressurised hydraulic fluid to raise the ram 127 and associated roller assembly 103 prior to a loading operation. This initial loading position of the roller assembly is shown with respect to FIG. 12*a*.

Figure 12A:
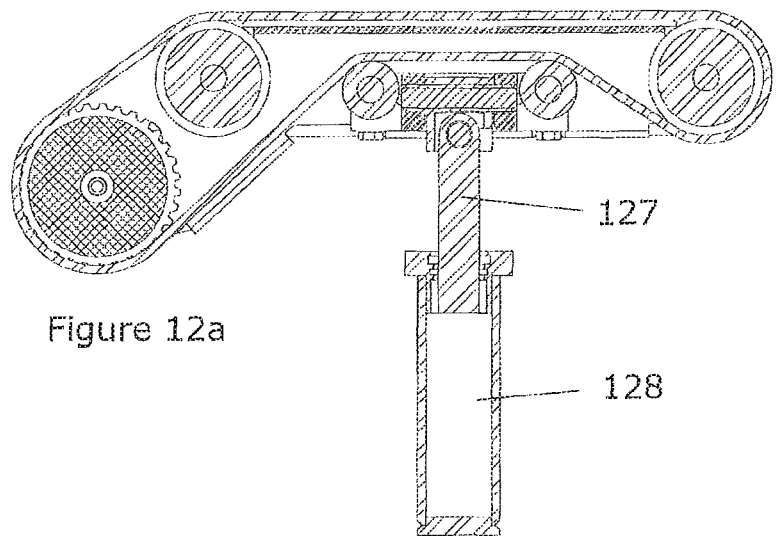
FIGS. 12a through 12c show a sequence of side cross section views of the roller assembly and drive mechanism of FIGS. 9 through 11 illustrating the action of the lifting structure provided in this embodiment.
Figure 12B:
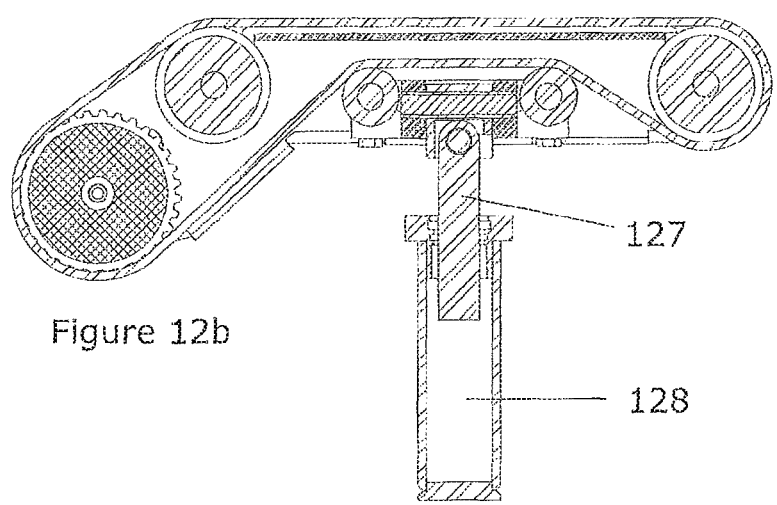
Figure 12C:
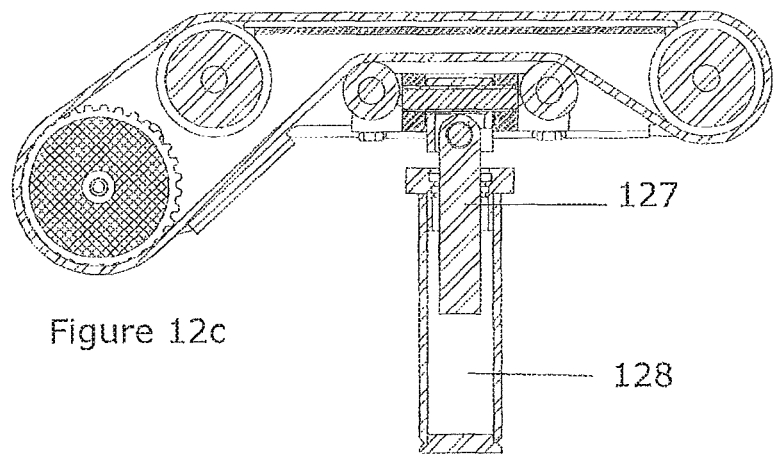

During loading hydraulic fluid is allowed to exit from the pressure housing 128 at a controlled flow rate, with the mid-point of this process shown with respect to FIG. 12*b*. This structure therefore allows the roller assembly to be lowered at a controlled rate during the boat loading operation, with the final position of the roller assembly being shown with respect to FIG. 12*c*.

Figure 13A:
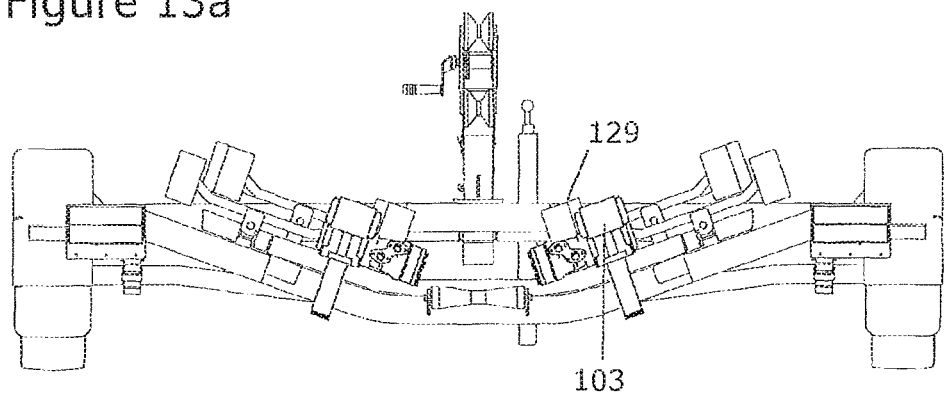
FIGS. 13a through 13c show a corresponding sequence of end views of the roller assemblies, drive mechanisms and boat loading road trailer of FIGS. 8 through 12 illustrating the action of the lifting structure provided in this embodiment.
Figure 13B:
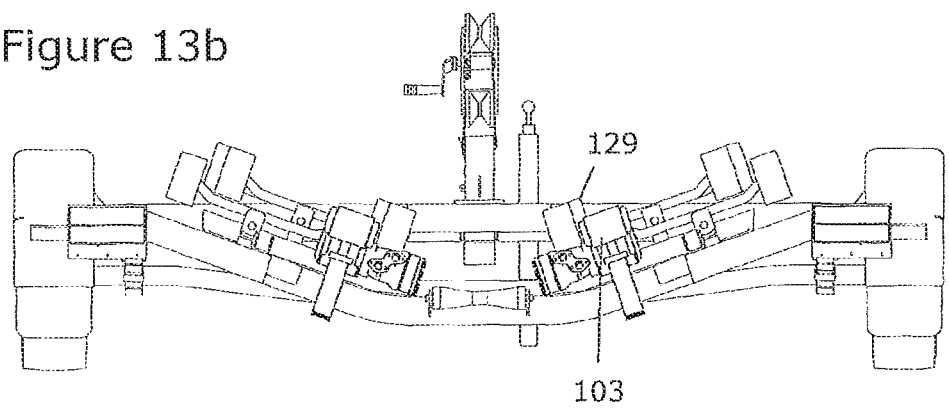
Figure 13C:
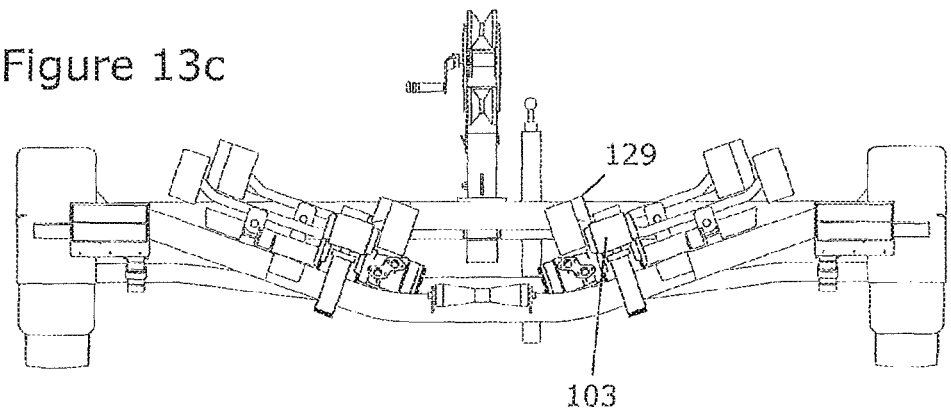

FIGS. 13*a* through 13*c* illustrate the position of the roller assembly shown in each of FIGS. 12*a* through 12*b* when mounted on the boat loading frame of FIG. 8.

In particular, FIG. 13*a* shows each roller assembly 103 placed in an initial lifted loading position prior to the loading of a boat to the frame. As can be seen from FIG. 13*a* the roller assembly 103 is lifted to approximately the same height as a set of passive loading rollers 129 mounted to the mid-point of the loading frame.

FIG. 13b shows the incremental lowering of each roller assembly which occurs as a boat is loaded onto the frame. As can be seem from this figure each roller assembly 103 is still close to the height of the mid-point rollers 129 and would be starting to transfer the weight of the boat to these rollers.

FIG. 13c shows the final position of the roller assemblies 103 once a boat is loaded, with each assembly dropping below the frame's mid-point rollers 129 once the boat is completely loaded.

The invention claimed is:

1. A boat support frame loading and unloading apparatus configured to draw a boat on to and off a boat support frame, the apparatus comprising:
 a boat support frame comprising a loading end and a terminal end opposite to the loading end;
 at least two roller assemblies mounted opposite one another symmetrically about a midline of the boat support frame adjacent to the loading end of the boat support frame, each roller assembly incorporating:
  at least one roller element, and
  drive mechanism configured to rotate one or more of the roller elements of the roller assembly to draw the boat onto and off the boat support frame through the loading end of the boat support frame, wherein each roller assembly of the at least two roller assemblies is pivotally mounted to tilt forwards, backwards, and side-to-side to engage with a hull of the boat; and
 at least one lifting structure configured to adjust a relative vertical position or location of the roller assemblies relative to the boat support frame to ensure the roller assemblies frictionally engage the hull of the boat during a boat loading or unloading operation, wherein
 when in use, the at least one lifting structure is configured to raise the at least two roller assemblies to a lifted position prior to and during a boat loading or unloading operation to lift the boat up and off the boat support frame so that the at least two roller assemblies grip against the hull of the boat, and so that the drive mechanism of each roller assembly is configured to rotate the roller elements to drive the boat onto or off the board support frame in a controlled manner.

2. The apparatus as claimed in claim 1, wherein the at least one lifting structure lowers the roller assemblies after the boat loading operation to lower the boat hull onto the boat support frame.

3. The apparatus as claimed in claim 1, wherein when in use, the at least one lifting structure lowers the roller assemblies after a boat loading and/or unloading operation at a controlled rate.

4. The apparatus as claimed in claim 1, wherein the lifting structure comprises a compression element.

5. The apparatus as claimed in claim 4, wherein the compression element comprises a ram.

6. The apparatus as claimed in claim 5, wherein
 the ram defines a mounting post to mount an associated roller assembly or roller assemblies to the boat support frame, and
 a housing of the ram defines a body of the mounting post, the ram free to move up and down in the housing.

7. The apparatus as claimed in claim 6, wherein the ram is locked in a fixed orientation within the housing.

8. The apparatus as claimed in claim 6, wherein
 the ram is a hydraulic ram,
 when in use, the housing is charged with pressurized hydraulic fluid to raise the ram and associated roller assembly or assemblies prior to a boat loading or unloading operation, and
 during and/or after a boat loading or unloading operation, hydraulic fluid is allowed to exit from the pressure housing to allow the roller assembly or assemblies to be lowered.

9. The apparatus as claimed in claim 8, wherein the hydraulic fluid exits the housing at a controlled flow rate to lower the roller assembly or assemblies at a controlled rate.

10. The apparatus as claimed in claim 1, wherein the lifting structure is connected to an associated roller assembly by a lateral pivot connector.

11. The apparatus as claimed in claim 1, wherein the lifting structure is connected to the roller assembly or assemblies by longitudinal pivot connector.

12. The apparatus as claimed in claim 1, wherein the lifting structure is connected to an associated roller assembly by a longitudinal pivot connector and a lateral pivot connector, the longitudinal pivot connector and lateral pivot connector each being arranged to rotate about a different axis of rotation to allow the roller assembly to sit at a complementary angle to a boat hull being loaded or unloaded.

13. The apparatus as claimed in claim 12, wherein the axis of rotation of the longitudinal pivot connector is substantially perpendicular to the axis of rotation of the lateral pivot connector.

14. The apparatus as claimed in claim 1, wherein each roller assembly comprises a hull contact surface belt.

15. The apparatus as claimed in claim 1, further comprising:
 at least one orientation biasing element configured to position the roller assembly or assemblies in a preferred initial loading orientation when the boat support frame is unloaded.

16. The apparatus as claimed in claim 15, wherein
 each roller assembly comprises a hull contact surface belt and at least one orientation biasing element, and
 the orientation biasing element orients the roller assembly so that an end of the belt adjacent to the loading end of the boat support frame is lower than an opposite end of the belt.

17. The apparatus as claimed in claim 15, wherein the orientation biasing element comprises a spring.

18. The apparatus as claimed in claim 15, wherein at least one orientation biasing element is provided between each roller assembly and a mounting post mounting the roller assembly to the boat support frame.

19. The apparatus as claimed in claim 1, wherein the at least one lifting structure is deployed between each roller assembly and the boat support frame.

* * * * *